United States Patent [19]

Peterson

[11] Patent Number: 4,675,666

[45] Date of Patent: Jun. 23, 1987

[54] SYSTEM AND METHOD FOR ALTERING AN ASPECT OF ONE OF A PLURALITY OF COINCIDENT VISUAL OBJECTS IN A VIDEO DISPLAY GENERATOR

[75] Inventor: William M. Peterson, Tempe, Ariz.

[73] Assignee: Motorola Inc., Schaumburg, Ill.

[21] Appl. No.: 866,674

[22] Filed: May 27, 1986

Related U.S. Application Data

[63] Continuation of Ser. No. 551,815, Nov. 15, 1983, abandoned.

[51] Int. Cl.$^4$ .............................................. G09G 1/14
[52] U.S. Cl. .................................... 340/721; 340/724; 340/729; 340/703; 273/85 G
[58] Field of Search ............... 340/701, 703, 721, 723, 340/729, 799, 724; 434/20, 43; 273/85 G, DIG. 28

[56] References Cited

U.S. PATENT DOCUMENTS

| | | | |
|---|---|---|---|
| 4,209,832 | 6/1980 | Gilham et al. | 434/20 |
| 4,423,870 | 1/1984 | Bristow | 273/DIG. 28 |
| 4,439,760 | 3/1984 | Fleming | 340/703 |
| 4,484,187 | 11/1984 | Brown et al. | 340/703 |
| 4,498,079 | 2/1985 | Ghosh et al. | 340/721 |
| 4,509,043 | 4/1985 | Mossaidus | 340/703 |
| 4,550,315 | 10/1985 | Bass et al. | 340/729 |

OTHER PUBLICATIONS

"Video Display Processor Simulator Three Dimensions", *Electronics,* 11-20-80, Guttag et al.

*Primary Examiner*—Gerald L. Brigance
*Attorney, Agent, or Firm*—Dale E. Jepsen

[57] ABSTRACT

A system and method for altering an aspect of one of a plurality of coincident visual objects comprises means for generating first and second coincident visual objects, the first visual object having an alteration attribute thereof. Means are provided for identifying the alteration attribute of the first visual object in conjunction with means responsive to the identifying means for altering the aspect of the second visual object. In accordance with the system and method of the invention, the color of a true object overlapping a fixed object of lesser priority may be modified such that it appears that the true object has entered the shadow of the fixed object.

3 Claims, 2 Drawing Figures

SYSTEM AND METHOD FOR ALTERING AN ASPECT OF ONE OF A PLURALITY OF COINCIDENT VISUAL OBJECTS IN A VIDEO DISPLAY GENERATOR

This is a continuation of application Ser. No. 551,815 filed Nov. 15, 1983 now abandoned.

BACKGROUND OF THE INVENTION

The present invention relates, in general, to the field of video display generators. More particularly, the present invention relates to a system and method for altering an aspect, for example color shading, of one of a plurality of coincident visual objects on a video display screen.

Generally, in a sophisticated microprocessor (MPU)-based video display, numerous background or "fixed" objects may be displayed. Such fixed objects are especially useful in video games and other graphics applications. Fixed objects are generally derived from a display system "screen memory" which generally comprises a block of DRAM, the full contents of which would describe the "visible screen".

In such video display systems, a user can display objects by individual "pels", or picture elements, in a "bit-plane mode", or fixed objects in a "list mode". The screen memory in the bit plane mode may be arranged in scan lines. within each scan line, the color of the first pel is followed by the color of the second, etc. The fixed objects in a list mode are defined in "image tables" which contain their pel-by-pel descriptions. A list mode screen memory is arranged as a "display list" of pointers to entries in the image tables, which include "attributes" of the images. These attributes allow each individual occurrence of an image to be altered, by for example, underlining or flashing.

"True objects" are video display generator hardware-intensive objects which are designed to move around on the video display screen and to run into, or collide with, other true or fixed objects. Such true objects comprise a small video pattern which is stored in a particular location in the memory of the video display generator. These true objects can be positioned on the screen independently of where they are stored in memory merely by defining their vertical and horizontal position. By use of true objects, a video display screen may be easily animated and the object stored in the particular location in memory may be made to move across the screen merely by changing its start address.

In such video display systems, it would therefore be useful to display an interaction between true objects and fixed objects. For example, when a true object overlaps a fixed object, the color of the highest priority object can be modified such that it appears that the true object has entered the shadow of the fixed object, becomes illuminated by a light source comprising a fixed object, etc. The use of software to effectuate such a display alteration would require extensive MPU utilization, virtually tying up the processing unit. It would therefore be highly desirable to implement such an object aspect altering system by means of readily integratable hardware which would relieve the system MPU from such "collision" or coincidence computations.

SUMMARY OF THE INVENTION

It is therefore an object of the present invention to provide an improved system and method for altering an aspect of one of a plurality of coincident visual objects in a video display generator.

It is further an object of the present invention to provide an improved system and method for altering an aspect of one of a plurality of coincident visual objects in a video display generator which allows for a threedimensional perception to a video display.

It is still further an object of the present invention to provide an improved system and method for altering an aspect of one of a plurality of coincident visual objects in a video display generator which may be integrated and readily implemented by circuit hardware.

It is still further an object of the present invention to provide an improved system and method for altering an aspect of one of a plurality of coincident visual objects in a video display generator which does not require extensive MPU implemented software instructions.

The foregoing and other objects are achieved in the present invention wherein there is provided a video display generator including a system and method for altering an aspect of one of a plurality of coincident visual objects which comprises means for generating first and second coincident visual objects, the first visual object having an alteration attribute thereof. Means are provided for identifying the alteration attribute of the first visual object in conjunction with means responsive to the identifying means for altering the aspect of the second visual object.

BRIEF DESCRIPTION OF THE DRAWINGS

The above mentioned and other features and objects of the invention and the manner of attaining them will become more apparent and the invention will be best understood by reference to the following description of an embodiment of the invention taken in conjunction with the accompanying drawings, wherein.

DESCRIPTION OF A PREFERRED EMBODIMENT

Figure 1:
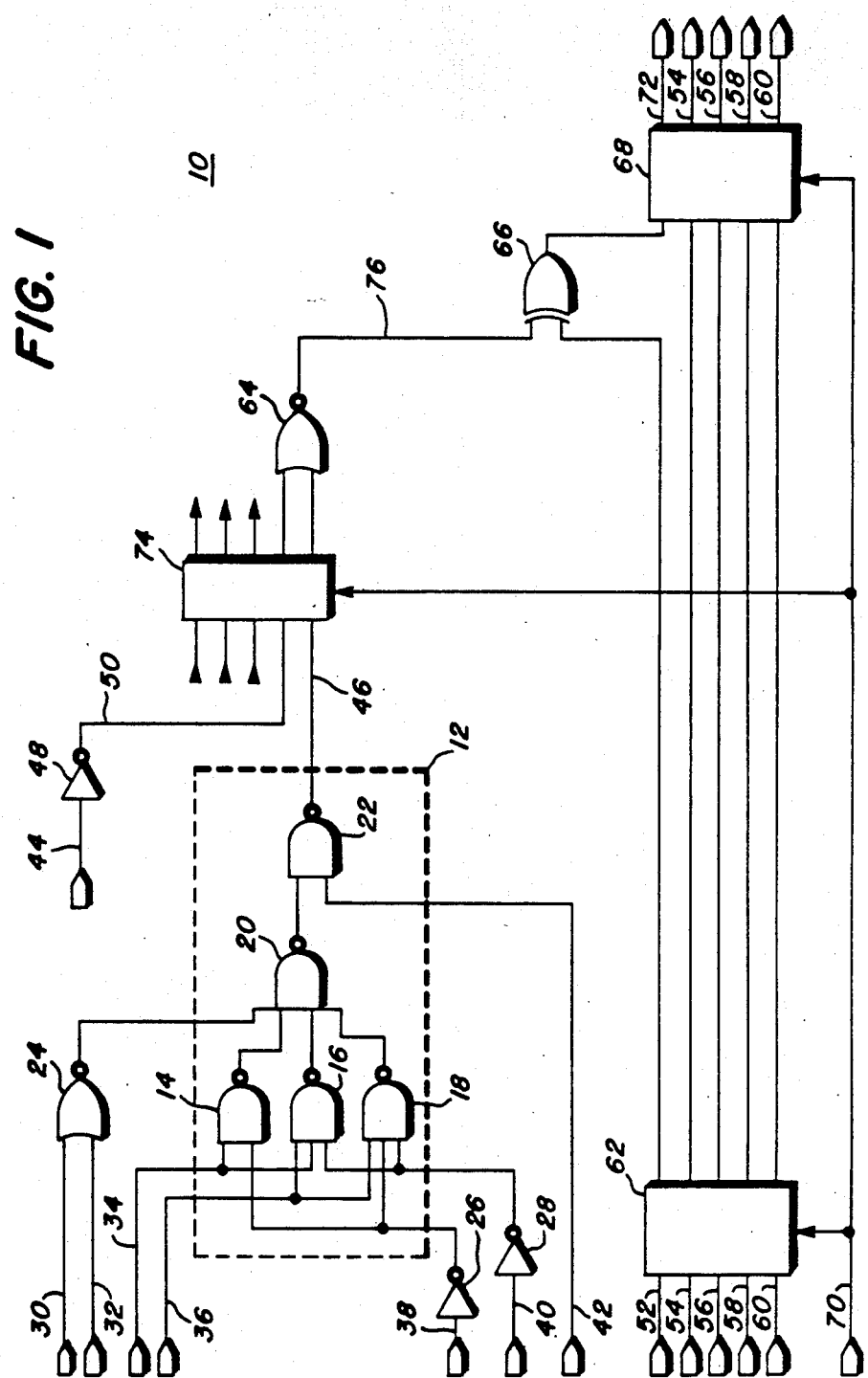
FIG. 1 is a simplified logic flow diagram of a system for altering an aspect of one of a plurality of coincident visual objects in a video display generator in accordance with the present, invention.

With reference to FIG. 1, a system 10 in accordance with the present invention is shown. As shown, system 10 comprises a comparator 12 which includes dual input NAND gates 14, 22; tri input NAND gates 16, 18; and quad input NAND gate 20.

Quad input NAND gate 20 has as one of its inputs the output of NOR gate 24 having as inputs fixed object pel value MSB line 30 and fixed object pel value second MSB line 32. Fixed object pel value third MSB line 34 is provided as one input to dual input NAND gate 14 and tri input NAND gate 16. Fixed object pel value LSB line 36 is supplied as one input to tri input NAND gates 16, 18.

A signal appearing on color collision MSB line 38 is inverted by means of inverter 26 for application to one input of dual input NAND gate 14 and tri input NAND gate 18. Similarly, a signal appearing on color collision LSB line 40 is inverted by means of inverter 28 for application to one input of tri input NAND gates 16, 18. The output of dual input NAND gate 14 and tri input NAND gates 16, 18 are supplied as the remaining inputs to quad input NAND gate 20, having its output connected to one input of dual input NAND gate 22. Fixed object enable line 42 supplies the remaining input to dual input NAND gate 22 having its output appearing on comparator output line 46.

A signal appearing on shading attribute line 44 is inverted through inverter 48 for application to inverter output line 50. Inverter output line 50 and comparator output line 46 are latched by means of latch 74 for application to the inputs of NOR gate 64. The output of NOR gate 64 appearing on inverting line 76 is supplied as one input to exclusive OR gate 66. The remaining input to exclusive OR gate 66 is supplied on true object data MSB line 52 as latched through latch 62. The output of exclusive OR gate 66 is latched by means of latch 68 for application to invertible true object data MSB line 72. In like manner, true object data second MSB line 54, true object data third MSB line 56, true object data fourth MSB line 58 and true object data LSB line 60 are latched through latches 62, 68. Clocking inputs to latches 62, 68 and 74 is supplied on pel clock line 70.

For use with the system 10 as above-described, the following three character per byte exemplary list mode may be utilized in the display of a fixed object:

|  | BIT |  |
| --- | --- | --- |
| Byte 1 | 7 | Always 1 |
|  | 6 | Color Collision 1 (MSB) |
|  | 5 | Color Collision 0 (LSB) |
|  | 4 | Priority 2 (MSB) |
|  | 3 | Priority 1 |
|  | 2 | Priority 0 (LSB) |
|  | 1 | Char Code 8 (MSB) |
|  | 0 | Char Code 7 |
| Byte 2 | 7 | Always 0 |
|  | 6 | Char Code 6 |
|  | 5 | Char Code 5 |
|  | 4 | Char Code 4 |
|  | 3 | Char Code 3 |
|  | 2 | Char Code 2 |
|  | 1 | Char Code 1 |
|  | 0 | Char Code 0 (LSB) |
| Byte 3 | 7 | Collision Enable |
|  | 6 | CMR Offset 4 (MSB) |
|  | 5 | CMR Offset 3 |
|  | 4 | CMR Offset 2 |
|  | 3 | CMR Offset 1 |
|  | 2 | Shading |
|  | 1 | Flash 1 |
|  | 0 | Color/Resolution or Flash 0 (LSB) |

Figure 2:
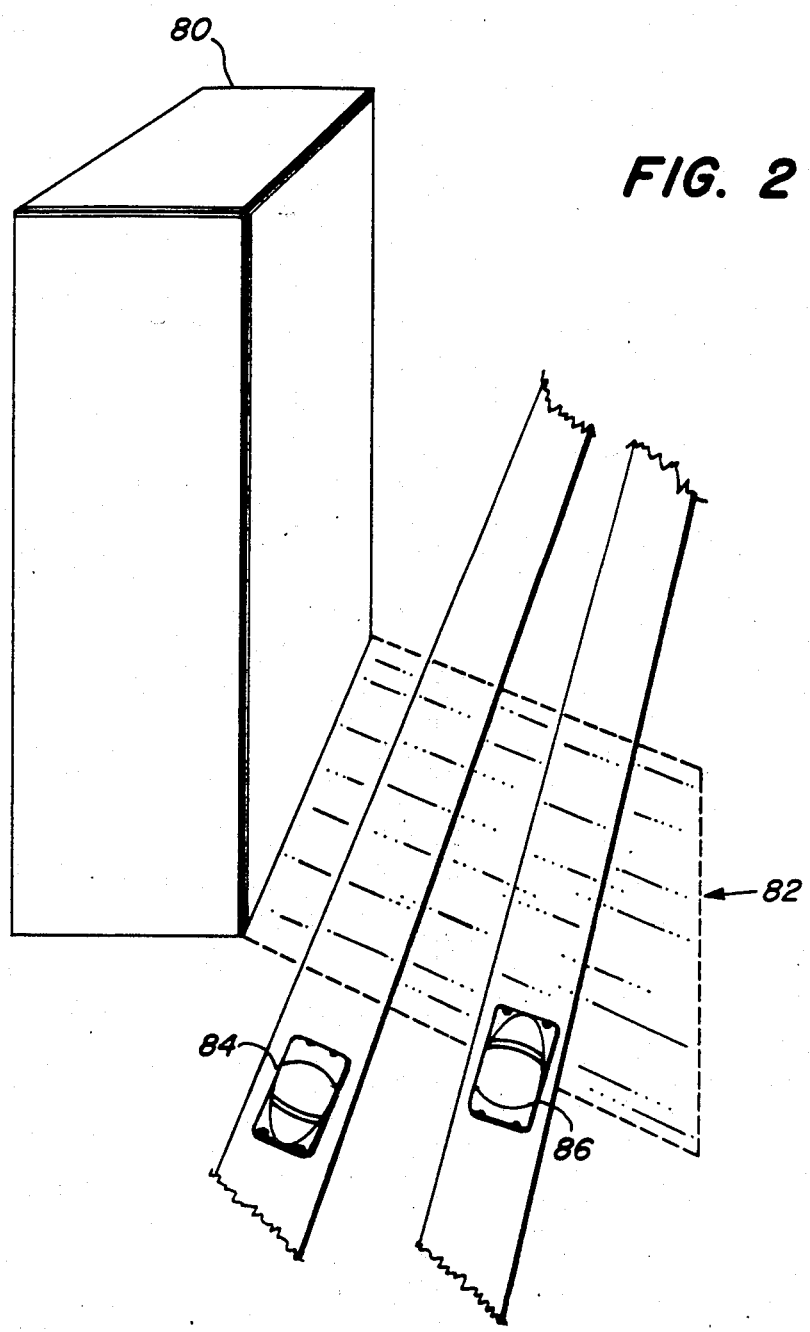
FIG. 2 is a simplified perspective view of an exemplary video display implementation of the system of FIG. 1 for use with, for example, color shading of a true object by a fixed object shadow.

With respect to this list mode and referring additionally to FIG. 2 showing fixed objects 80, 82 (building and shadow) and true objects 84, 86 (two automobiles), the relevant attributes of system 10 include:

Priority

Priority is used to simulate a third dimension in the display. It is used to determine which item is in front (visible) when two objects occupy the same place on the screen. The higher the value of the priority attribute, the closer the character is considered to be to the front of the screen. Priority becomes useful only with true objects 84, 86, which can be displayed anywhere on the screen independent of the display list.

The fixed objects 80, 82 of this list mode can have any one of eight priorities. The fixed object 80, 82 priorities interleave with true object 84, 86 priorities. When, for example, a true object is placed at the same location as a fixed object with the same priority, (not shown) the fixed object is visible. As a result, a true object priority $\phi$ will appear behind fixed objects with priority $\phi$. Actually, the attribute may be more flexible than this. Each fixed object can have two priorities, as described for the color collision attribute (infra). Conversely, a true object 86 with a given priority placed at the same location as a fixed object 82 of lesser priority will render the true object 86 visible.

Collision Enable

Collision is another attribute of fixed objects 80, 82 to make them easier to use in game applications. Collision is a one-bit code. A true object 84, 86 with collision enabled can collide with fixed objects 80, 82 that also have their collision enable bit set. That is, when a true object 84, 86 and a fixed object 80, 82 try to occupy the same XY location on the screen, a collision will be reported only if they both have their collision enables set.

Collisions are reported to the MPU on a true-object basis. Each true object 84, 86 has one bit to report collisions with fixed objects 80, 82, and other bits to report collisions with other true objects (not shown). Collision and priority are entirely different attributes. Two true objects, or a true object and a fixed object, do not have to have the same priority to collide.

Color Collision

Color collision is used with fixed objects 80, 82 to determine which part of the fixed object 80, 82 is allowed to cause a collision. It is a two-bit code. The value of the fixed object's 80, 82 pel data, before color mapping RAM (CMR) offset is attached, must be greater than the color collision value for a collision to be detected. If the pel data is greater than the color collision value then that pel's priority is determined by the character's priority attribute.

Shading

Shading is a fixed object attribute in the abovedescribed list mode that affects true objects, 84, 86 with higher priority when they move in front of a fixed object 82.

The color collision test described above is used for shading as well, if the shading attribute bit is set. If the fixed object's 82 pel value is greater than the two-color collision bits, the most significant bit of the true object's 86 CMR offset is inverted. If the fixed object's 82 pel value is less than or equal to the two color collision bits, nothing is done to the true object's 86 CMR offset.

This attribute allows the following effect: give a fixed object 82 or group of fixed objects a different color representing shade cast by some other fixed object 80, where the shaded color has a higher pel value than the color collision attribute, and the unshaded color has a lower or equal value. Every true object 86 passing through the shaded area can automatically seem to be shaded, too, if the proper colors are in the CMR. This feature is independent of the color value of the true objects 84, 86.

Thus, it can be seen that fixed objects can flag or ignore true objects when they overlap. A fixed object, which always occupies a rectangular block, can be partly background color and partly "solid" object. The collision reporting to the MPU and the background-/foreground selection will be made only when the true object overlaps the solid part of the fixed object. Since the arrangement of colors in the CMR registers is arbitrary, this puts no restriction on what colors are solid. Only the CMR address, not its contents, affects this.

Shading is a related feature. Part of a fixed object can be a different color representing a shadow; selecting the shading attribute allows a true object to change color as it passes through the shade. Once again, the shade can be any color, since only the CMR address determines what gets shaded.

A true object can be held at the center of the screen while the rest of the scene is scrolled around it, and it seems to pass behind some parts and in front of others; alternately, the true objects could move over a stationary background. Each could move independently and simultaneously, or some could move while other true objects remained attached to the scenery.

With respect to the system 10 of FIG. 1 and the foregoing fixed object list mode, it can be seen that an enable signal is applied on fixed object enable line 42 when bit 7 of byte 1 is set. Color collision value inputs to comparator 12 are supplied on color collision MSB line 38 and color collision LSB line 40 by means of bits 6 and 5 respectively of byte 1. This color collision value is compared with the fixed object's pel value as input to comparator 12 on fixed object pel value MSB line 30, fixed object pel value second MSB line 32, fixed object pel value third MSB line 34 and fixed object pel value LSB line 36.

By use of comparator 12, a logic one level will appear on comparator output line 46 if the fixed object's pel value is less than or equal to the two color collision bits applied on color collision MSB line 38 and color collision LSB line 40. Conversely, a logic zero will appear on comparator output line 46 if the fixed object's pel value is greater than the value of the two color collision bits. Bit 2 of byte 3 of the fixed object's list mode is applied to shading attribute line 44 which is inverted through inverter 48 for application to inverter output line 50. Thus, if the shading attribute bit is set, and the fixed object's pel value is greater than the two color collision bits, two logic zeroes will be applied to the inputs of NOR gate 64 thus producing a logic one level on inverting line 76. Applying a logic one level on inverting line 76 to one input of exclusive OR gate 66 will cause an inversion of the logic level appearing on true object data MSB line 52 at the output of exclusive OR gate 66 on invertible true object data MSB line 72. Should a logic zero appear on inverting line 76 for input to exclusive OR gate 66, the logic level appearing on invertible true object data MSB line 72 will be the same as that appearing on true object data MSB line 52.

Invertible true object data MSB line 72, true object data second MSB line 54, true object data third MSB line 56, true object data fourth MSB line 58 and true object data LSB line 60 are coupled to the video display generator color mapping RAM (CMR). The color mapping RAM consists of a number of registers in the video display generator. Each register can be set to any one of various colors. The user selects colors to be displayed by choosing the CMR address, not the color itself. In general, each CMR location may occupy two bytes comprising red, green and blue bits which are used as inputs to digital to analog (D/A) converters that drive the red, green and blue outputs of the video display generator.

Therefore, the outputs of system 10 appearing at latch 68 can be used as color pointers to one half of the registers of the video display generator CMR. By inverting the logic level on invertible true object data MSB line 72, 16 an alternate and equal number of registers may be addressed into which an appropriate color change may be programmed such that a true object would appear to have been shaded by its coincidence with the fixed object.

What has been provided therefore is an improved system and method for altering an aspect of one of a plurality of coincident visual objects in a visual display generator which allows for a three-dimensional perception to a video display. Further, the system and method of the present invention does not require extensive MPU implemented software instructions and may be integrated and readily implemented by circuit hardware.

While there have been described above the principles of the invention in conjunction with specific apparatus, it is to be clearly understood that this description is made only by way of example and not as a limitation to the scope of the invention.

I claim:

1. In a video display system wherein a first visual object is displayed, a second visual object is displayed, part of said second visual object overlaps said first visual object and an overlapping signal is produced to indicate when said overlapping part of said second visual object overlaps said first visual object, a video display generator including a system for altering the color of said overlapping portion of said second visual object comprising:

means for generating said first and second visual objects, said first visual object having a first digital word comprising pel values and a second digital word comprising a color collision value associated therewith, and said second visual object having a third digital word comprising color mapping ram data associated therewith which determines the color of said second visual object;

means for comparing said first digital word and said second digital word to produce or not produce an enable signal; and means responsive to said enable signal and said overlapping signal for altering said third digital word thereby changing the color of said overlapping portion of said second visual object.

2. The video dispaly generator of claim 1 wherein said comparing means comprises hardware logic means.

3. The video diaplay generator of claim 1 wherein said comparing means produces said enable signal when the value of said first digital word exceeds the value of said second digital word.

* * * * *